United States Patent Office 3,625,065
Patented Dec. 7, 1971

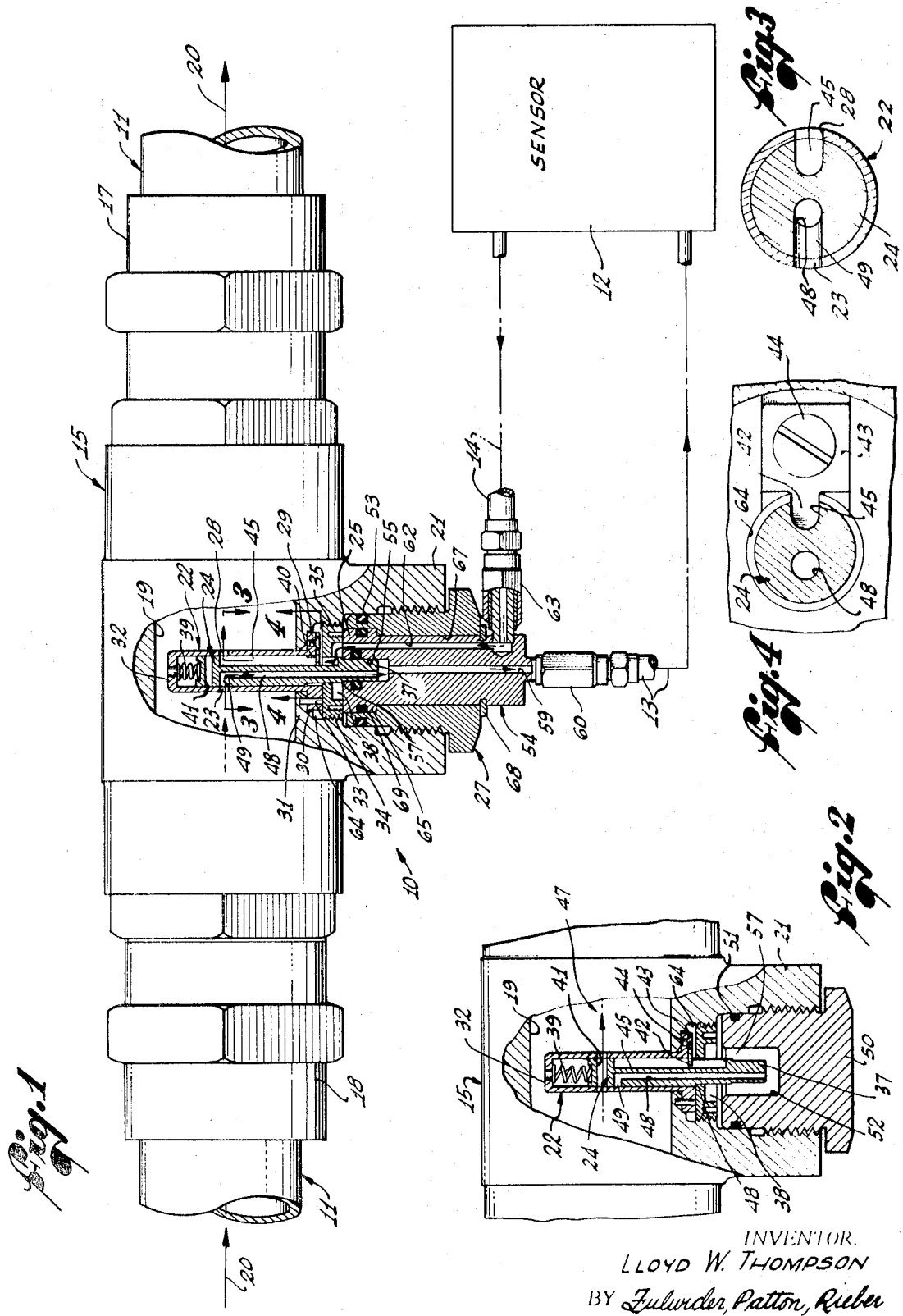

3,625,065
FLUID SAMPLING DEVICE
Lloyd W. Thompson, Buena Park, Calif., assignor to Thompson Industries, Buena Park, Calif.
Filed Apr. 6, 1970, Ser. No. 25,940
Int. Cl. G01n 1/10
U.S. Cl. 73—422                    10 Claims

ABSTRACT OF THE DISCLOSURE

A device having a ported probe projecting into a fluid conduit to withdraw fluid from the center thereof, a valve plunger movable in the probe between open and closed positions and normally held in the closed position, and a detachably mountable sampling fitting operable during coupling to the device to shift the plunger to the open position while simultaneously connecting the inlet and return ports of the probe through the plunger to the inlet and return lines of a particle counter.

BACKGROUND OF THE INVENTION

This invention relates to a device for withdrawing fluid from a conduit, and has particular reference to a fluid-sampling device for incorporation in a hydraulic system, such as the control system of an aircraft, to withdraw a fluid sample for testing and analysis in order to determine the level of contamination of the fluid, for example, by passing the sample through a sensor or fluid analysis apparatus which measures and counts solid particles in the fluid.

Many types of modern, complex machines, and particularly aircraft, utilize sophisticated and relatively delicate hydraulic control systems, and there is a growing realization that contamination of the hydraulic fluid of such a system by solid particles that accumulate over prolonged periods of service use can be a significant factor in the malfunctioning of the system. Consequently, it has been recognized that there is a need for periodic inspection of the fluid, and either replacement of contaminated fluid with clean fluid or filtration of the fluid to remove accumulated solids therefrom.

Although satisfactory sensors are readily available on the market, the taking of a sample from an existing system for processing through a sensor is a time-consuming operation that presently is accomplished simply by opening a drain plug and withdrawing part of the fluid, which then is fed into the sensor for analysis. After being processed through the sensor, the sample usually is discarded. One important disadvantage of this procedure, in addition to the time required, is the fact that the sample typically is withdrawn from a portion of the conduit where a disproportionately high concentration of contamination exists because of settling of solids into the drain area.

A few sampling devices that have been proposed utilize sampling elements which project into the central portion of a conduit to avoid taking sediment with the sample. Such devices have not met with acceptance in the trade, however, because of complexity of structure or operation, susceptibility to clogging in use, or other factors reducing reliability and convenience of operation.

SUMMARY OF THE INVENTION

The present invention resides in a novel device for withdrawing a fluid sample from a hydraulic system for testing, and capable of returning the sample to the system after testing so as to avoid unnecessary loss of fluid, the device being permanently installable in a system for immediate use when a test is to be made, being both simple in structure and reliable in operation, and being automatically opened and coupled to inlet and return lines for the fluid sample as an incident to a single rapid and simple manipulation of the parts of the device. More specifically, the device includes a ported probe for projecting into a central portion of a conduit from which fluid is to be withdrawn, and a valve member telescoped with the probe for movement relative thereto between open and closed positions, respectively, in response to the attachment and detachment of a sampling fitting for coupling the device to the inlet and return lines.

In the normal, inoperative condition of the device, the sampling fitting is removed and the device is sealed by a plug which leaves the valve member in the closed position, preferably with the sampling ports open for an idle path through the probe to flush the ports and prevent accumulation of contaminants therein. When a sample is to be taken, the plug is removed and the sampling fitting is inserted, shifting the valve member to the open position and simultaneously establishing the sampling and return flow paths. In this manner, the sampling device minimizes the loss of fluid, even if system pressure is maintained during the changeover, and normally returns the sample to the system through the return line and the probe.

Other features and advantages of the invention will become apparent from the following detailed description, taken in conjunction with the accompanying drawings.

BRIEF DESCRIPTION OF THE DRAWINGS

FIG. 1 is a fragmentary side elevation, partly broken away and shown in section, of a sampling device embodying the novel features of the present invention, with an associated sensor shown schematically;

FIG. 2 is a fragmentary view similar to part of FIG. 1 with the sampling fitting replaced by a plug;

FIG. 3 is an enlarged cross-section taken substantially along the line 3—3 of FIG. 1; and FIG. 4 is an enlarged fragmentary cross-section taken substantially along the line 4—4 of FIG. 1.

DETAILED DESCRIPTION

As shown in the drawings for purposes of illustration, the invention is embodied in a device 10 for withdrawing a fluid sample from a conduit 11 for testing by a sensor 12, the latter being connected to the sampling device by an inlet line 13 through which the sample is delivered to the sensor and a second line 14 which receives the sample from the sensor after it has been tested and herein returns the sample through the sampling device to the conduit 11. While the sampling device may be used in different environments, it is particularly well suited for permanent installation in a conduit of an aircraft hydraulic system for use in periodically taking samples of the hydraulic fluid of the system and passing the fluid through a particle counter with which the number and sizes of solid particles contaminating the fluid can be determined. Such particle counters are well known in the art, so the sensor 12 is shown only schematically herein.

In the present instance, the sampling device 10 is mounted on a T-shaped tubular pipe fitting forming an adaptor 15 which is coupled at its left and right ends to two in-line sections of the fluid conduit 11 by two fittings 17, 18 so that the interior passage 19 of the adaptor constitutes a connecting extension of the conduit, through which fluid flows in the direction of the arrows 20 in FIG. 1. Projecting downwardly from the underside of the adaptor is a neck 21 in which the sampling device is mounted, the adaptor being angularly adjustable relative to the sections of the conduit to dispose the neck in any desired angular position.

In accordance with the present invention, the sampling device 10 includes a probe 22 projecting into the interior of the adaptor 15 and formed with an inlet port 23 in the central portion of the connecting extension 19 of the conduit 11, and a valve member 24 is telescoped with the probe and selectively movable relative thereto between open and closed positions, the valve member normally being held in the closed position to close the sampling device, and being movable to the open position by an actuator 25 on a detachably mountable sampling fitting 27 for connecting the device to the inlet line 13. As the sampling fitting is coupled to the sampling device, the actuator shifts the valve member to the open position to activate the sampling device and deliver fluid to the sensor 12. At the same time, the return line 14 preferably is connected through the sampling device to a return port 28 in the probe to return tested fluid to the conduit.

In this instance, the probe 22 is a hollow tube having a radial flange 29 formed around its outer end and disposed in a recess 30 at the inner end of the adaptor neck 21, the inner end portion of the probe projecting into the conduit extension 19 through a hole in a wall 31 of the adaptor partially closing the inner end of the neck. An end wall 32 extends across the inner end of the probe, which is held securely in place in the adaptor by a locating pin 33 extending through the flange into the wall 31 to prevent turning of the probe. A cup-shaped retainer 34 is threaded into the neck at 35 to clamp the flange 29 against the wall 31.

The inlet port 23 is formed in one side of the probe 22, the left or upstream side as viewed in FIG. 1, and is close to the center of the conduit extension 19 so as to admit fluid into the probe a substantial distance away from all areas in which sediment might collect. the port herein being centered on the longitudinal axis of the conduit. The inlet and return ports may be disposed at any desired angle with respect to the flow path. The valve member 24 is a plunger of the same cross-sectional shape as the inside of the probe, herein circular, and is telescoped coaxially into the probe with a close sliding fit. A stem 37 on the lower or outer end of the plunger projects through a hole in the center of the retainer 34 with a close fit, and projects into a chamber 38 beyond the retainer.

A spring 39 compressed between the end wall 32 of the probe and the inner end of the plunger urges the latter outwardly relative to the probe. It will be seen in FIG. 2 that this spring normally holds the plunger in the closed position in which an annular shoulder 40 around the plunger abuts against the inner side of the retainer. In this position of the plunger 24, a radial through-bore 41 in its inner end portion is aligned with the inlet port 23 of the probe 22 and communicates through the plunger with the return port 28 which is aligned with the inlet port in the downstream side of the probe. The angular position of the plunger within the probe is fixed by a key tab 42 (see FIG. 4) on a plate 43 that is fastened to the flange 29 by a screw 44, the tab being disposed in a longitudinal groove 45 in the right side of the plunger. Thus, the through-bore 41 normally is maintained in alignment with the inlet and outlet ports, and fluid entering the inlet port simply flows through the probe, as indicated by the arrow 47 in FIG. 2, and continuously flushes the ports to prevent solids from accumulating therein.

It will be seen in FIG. 2 that a longitudinal passage 48 is formed in the plunger 24 to extend from the outer end thereof through the stem 37 and the body of the plunger to a branch passage 49 that opens radially through the left side of the plunger in angular alignment with the inlet port 23, but spaced from the inlet port when the plunger is in the closed position. When the sampling device is not in use, a plug 50 (FIG. 2) is threaded into the neck 21 with an O-ring 51 around its inner end for preventing leakage of fluid out of the chamber 38. A cavity 52 in the inner end of the plug provides clearance for the stem 37 of the plunger, as shown in FIG. 2.

When the sampling device 10 is to be activated in order to take a sample of the fluid flowing through the conduit 11, the plug 50 is removed and the sampling fitting 27 is threaded into the neck 21 in its place, as shown in FIG. 1. This fitting has an externally threaded body similar to the plug, with an O-ring 53 around its inner end portion preventing leakage of fluid around the fitting, and, in addition, has a generally cylindrical core 54 which serves the dual purposes of shifting the plunger 24 to the open position as the fitting is turned into the neck, and of simultaneously connecting the inlet passage 48 to the inlet line 13 and the return port 28 to the return line 14.

The plunger is moved to the open position by the inner end of the core 54, the inner end thus forming the actuator 25. As shown in FIG. 1, a cylindrical recess 55 is formed in the core, coaxial with the plunger 24, to receive the outer end portion of the stem 37 with a close slidiing fit, and the portion of the stem that slides into the recess is of reduced diameter so as to form an outwardly facing shoulder 57 on the stem for engaging the core before the end of the stem engages the bottom of the recess. Thus, the core slides along the stem, engages the shoulder 57, and then pushes the plunger inwardly to the open position shown in FIG. 1. A vent 58 is formed in the end wall 32 of the probe to pass fluid into and out of the probe during plunger movement. As the plunger reaches the open position, the inner end of the core "bottoms" against the retainer, which thus determines the open position.

As shown in FIG. 1, the longitudinal inlet passage 48 in the plunger 24 opens into the recess 55 in the core 54 beyond the end of the stem 37, and communicates through the space at the bottom of the recess with a conduit 59 extending longitudinally through the core. A hose fitting 60 is mounted on the outer end of the core for connection to the inlet line 13, and an O-ring 61 in an internal groove in the wall of the recess, around the stem, prevents leakage of fluid back around the stem into the chamber 38. This insures that the fluid sample will flow from the plunger 24 through the core 54, and then through the inlet line 13 and into the sensor 12 for analysis.

To set up a return path for fluid through the sampling device 10, a second conduit 62 in the core 54 extends from the chamber 38 at the inner end, longitudinally through the core to a second hose fitting 63 which preferably projects laterally from the outer end of the core and is connected to the return line 14. Thus, the return line delivers the tested fluid through the conduit 62 to the chamber 38.

It will be seen in FIG. 1 that the longitudinal groove 45 in the right side of the plunger 24 extends through the retainer 34 to open into, and communicate with, the chamber 38. Although the key tab 42 projects into this groove above the retainer, an annular chamber 64 around the plunger by-passes fluid around the key tab to flow along the groove toward the inner end of the probe 22.

When the plunger 24 is in the closed position (FIG. 2), the inner end of the groove 45, which terminates short of the through-bore 41, is spaced outwardly from the return port 28 but in angular alignment with the port. Then, as the plunger is moved into the open position (FIG. 1), the inner end portion of the groove shifts into full communication with the return port. Accordingly, the returning fluid that flows from the core conduit 62 into the chamber 38 then flows along the return passage formed by the groove and passes through the return port into the conduit extension 19 to rejoin the fluid in the hydraulic system. Little, if any, fluid is lost in the testing operation, and fluid may be removed, tested and returned without any appreciable pressure drop, thereby permitting sampling from high pressure lines without restrictions that might interfere with the passage of larger contaminant particles.

For convenience during installation and removal of the sampling fitting 27, the core 54 is rotatably supported within its threaded body, thereby permitting the body to be turned into the adaptor 15 while the lines 13 and 14 are connected to the sensor 12. For this purpose, the core has a cylindrical head on its inner end, seated in an enlarged end portion 65 of a coaxial bore 67 in the threaded body, and is rotatably retained in the bore by a snap ring 68 at the outer end of the body. An O-ring 69 around the head prevents leakage of fluid past the core.

From the foregoing, it should be evident that the present invention provides a novel, reliable, and highly effective sampling device 10 for withdrawing representative samples from a hydraulic system in a rapid and simple operation requiring only the removal of a plug 50 and the coupling to the device of a sampling fitting 27 for both opening the probe 22 and connecting the inlet and return ports 23 and 28 to the proper lines of the sensor 12. The sample is taken from the central portion of the conduit, away from all accumulated sediment, and the overall construction is relatively simple so that the cost of installation may be readily justified in view of the eventual saving in time and the increased reliability of samples.

It also will be evident that, while a particular embodiment has been illustrated and described, various modifications and changes may be made within the spirit and scope of the invention.

I claim:

1. A sampling device for withdrawing a fluid sample from a conduit to supply a fluid analysis apparatus, said sampling device comprising:
   an adaptor mountable on said conduit and having an interior passage for communicating with the conduit;
   a tubular probe supported on said adaptor and projecting into said passage, said probe having an inlet port on one side for receiving fluid from said passage;
   a plunger disposed in said probe and movable longitudinally therein between open and closed positions, said plunger having an inlet passage therein movable into communication with said inlet port as the plunger is moved to said open position;
   means normally holding the plunger in said closed position;
   and a sampling fitting detachably mountable on said adaptor when a sample is to be withdrawn from the conduit, said sampling fitting including an actuator operable to shift said plunger to said open position as the fitting is mounted on the adaptor, and means communicating wtih said inlet port through said inlet passage after the plunger is in said open position, thereby to receive fluid from said conduit for delivery to the analysis apparatus.

2. A sampling device as defined in claim 1 in which said probe also has an outlet port spaced from said inlet port, and said plunger also has a return passage communicating with said outlet port when said plunger is in the open position, and further including means in said sampling fitting communicating with said return passage when the fitting is mounted on said adaptor and operable to return the fluid sample from the apparatus to the conduit.

3. A sampling device as defined in claim 2 in which said plunger includes a through-bore extending between said inlet and return ports when the plunger is in said closed position, thereby providing for continuous flushing of the ports when the sampling device is inactive.

4. A sampling device as defined in claim 1 in which said adaptor is a T-shaped pipe fitting and said sampling fitting is threadable into one side thereof, said actuator being carried rotatably on said fitting for abutting engagement with said plunger to shift the latter inwardly from said closed position to said open position as the sampling fitting is threaded into the adaptor.

5. A sampling device as defined in claim 4 in which said plunger has an outer end portion for seating in said actuator during mounting of said sampling fitting, said inlet passage opening through said outer end portion and communicating with a conduit therein connectable to said analysis apparatus.

6. A sampling device as defined in claim 2 in which said return passage is a groove extending along one side of said plunger from said return port toward said actuator, the latter having a return conduit communicating with said groove to carry fluid back through said probe for return to said conduit.

7. A sampling device as defined in claim 6 further including a key fast on said adaptor and projecting into said groove to prevent turning of said plunger relative to said probe.

8. A sampling device for withdrawing a fluid sample from a conduit, said sampling device comprising:
   a probe mountable on said conduit and having an inlet port in one side of the probe disposed in a central portion of the conduit;
   a valve member telescoped with said probe and mounted for relative movement between open and closed positions, said valve member having an inlet passage movable into and out of communication with said inlet port during such movement;
   means normally holding said valve member and said probe relative to each other in said closed position;
   and sampling means for moving said valve member to said open position and connecting said inlet passage to an inlet conduit for receiving of a fluid sample from the conduit, said sampling means including a detachably mountable sampling fitting engageable with said valve member during mounting of the fitting, and operable to move said valve member to said open position incident to such mounting.

9. A sampling device as defined in claim 8 further including a return port in said probe, a return passage in said valve member communicating with said return port when the valve member is in said open position, and a return conduit on said sampling fitting connected to said return passage as an incident to such mounting.

10. A sampling device as defined in claim 9 in which said valve member is a plunger telescoped into said probe, and said holding means is a spring urging said plunger outwardly toward said closed position, said sampling fitting having an actuating abutment thereon for shifting said plunger to said open position against the action of said spring, and having said conduits therein for communicating with said ports along said plunger.

References Cited
UNITED STATES PATENTS
1,964,270   6/1934   Nidever et al. _____ 73—422

E. CLEMENT SWISHER, Primary Examiner